Dec. 29, 1953     S. NOODLEMAN ET AL     2,664,534

VARIABLE SPEED ALTERNATING CURRENT MOTOR

Filed Jan. 20, 1950

INVENTORS
SAMUEL NOODLEMAN AND
BY ARTHUR G. WISE

Dybvig & Dybvig
Their Attorneys

Patented Dec. 29, 1953

2,664,534

UNITED STATES PATENT OFFICE 2,664,534

VARIABLE SPEED ALTERNATING CURRENT MOTOR

Samuel Noodleman and Arthur G. Wise, Dayton, Ohio, assignors to Louis R. Mahrt and D. Robert Laughter, as trustees for Standard Dayton Corporation, Dayton, Ohio, a corporation of Ohio Application January 20, 1950, Serial No. 139,588

10 Claims. (Cl. 318—225)

This invention relates to a new and improved type of variable speed alternating current motor.

A large number of arrangements have been proposed from time to time for controlling the speed of alternating current electric motors or for providing variable speed motors, but none have proven entirely satisfactory, especially where the load on the motor has been a variable load. Thus, one of the disadvantages with a motor equipped with any of several types of well-known speed control arrangements is that the speed of the motor under no load conditions corresponds very nearly to the synchronous speed of the motor and changes in the load or line voltage greatly affects the speed of the motor, whereas it is an object of this invention to provide a speed regulating means wherein a change in either the load or the line voltage does not cause any appreciable change in the speed of the motor, so that if the motor is set to operate at half speed, for example, it will operate at that speed irrespective of the line voltage or the loading.

It is an object of this invention to provide a speed control arrangement wherein the motor is provided with some means for generating a current for increasing the effective number of poles so as to affect the speed characteristics of the motor.

Another object of this invention is to provide an alternating current motor wherein by properly connecting the coils of the motor, it is possible to use a portion of the coils for energizing the main field of the motor and to use another portion of the coils for linking the rotor flux so as to establish additional field poles of variable strength.

Still another object of this invention is to provide a simple and practical control which does not require any complicated moving parts.

Other objects and advantages reside in the construction of parts, the combination thereof and the mode of operation, as will become more apparent from the following description.

Figure 1:
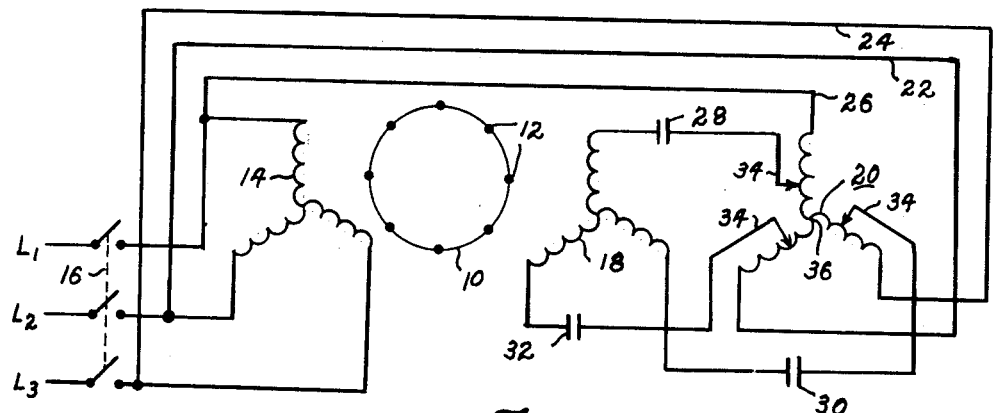
Figure 1 is a schematic circuit diagram showing a preferred embodiment of our invention.

For purposes of illustrating our invention, we have shown in Figure 1 of the drawings a polyphase alternating current motor of the type having a squirrel cage rotor, whereas certain aspects of our invention are equally applicable to motors having wound rotors as well as motors of the type in which a rotating field is used either with a wound stator or with a stator of the type having conductor bars functioning much the same as the conductor bars of a squirrel cage motor. The invention is also applicable to both single phase and polyphase motors.

Referring now to the drawing, reference numeral 10 designates a squirrel cage rotor provided with a plurality of conductor bars diagrammatically shown at 12. The stator consists of a first three phase field winding 14 which is adapted to be directly connected to the power lines designated as $L_1$, $L_2$ and $L_3$. The flow of current to the winding 14 may be controlled by any conventional switch means such as the switch 16.

A second three phase winding 18 has been provided which is circumferentially spaced from the winding 14 so as not to pick up the stator flux produced directly by the winding 14 but so as to pick up the rotor flux resulting from the flow of current through the rotor bars 12. While we have shown only the two sets of windings 14 and 18, it is obvious that in actual practice additional windings may be used. Thus, a separate winding could, for example, be provided in each quadrant of the stator.

Contrary to expectations, it has been found that if the winding 14 is connected to a source of power without any connection being made to the winding 18, the motor will operate at or near its normal expected synchronous speed, whereas if the winding 18 is shorted, the motor will operate at a greatly reduced speed. It has also been found that with an increase in the mechanical load on the motor, the voltage across the shorted winding 18 will decrease proportionately as the mechanical load on the motor increases, and thus the mechanical load does not appreciably change the speed of the motor. By shorting the winding 18, either directly or through a variable load, as shown in Figure 1, the current flowing through the rotor bars 12 increases, depending upon the amount of load connected across the winding 18. The speed of the motor is then determined by the amount of the electrical load connected to the windings 18. It has also been found that for any given electrical load across the winding 18, the motor will tend to operate at substantially constant speed, irrespective of any change in the mechanical load on the motor. Likewise, it has been found that contrary to expectations the voltage across the winding 18 varies inversely with the mechanical load. Another phenomenon of such an arrangement is that if a wattmeter is connected to the main power lines during a change from no mechanical load on the motor to a maximum mechanical load on the motor, the readings remain substantially the same at all these loads, indicating that an electrical load across the phase winding 18 serves to artificially load the rotor and that as the rotor is mechanically loaded, the artificial loading automatically disappears in proportion to the mechanical loading.

In order to reduce any inefficiency which would result from directly connecting an artificial load across the phase winding 18, the phase winding 18 is connected to a variable transformer 20 and the output of the transformer is fed into the phase winding 14 through the lines 22, 24 and 26 which are arranged as shown. In order to neutralize the reactance of the winding 18, capacitors 28, 30 and 32 have been provided as shown. These capacitors, for best results, are balanced with the reactance of the winding 18 at the lowest speed at which the motor would normally be required to operate. In this manner the best speed regulation is obtained at the low speeds. In some cases flat speed regulation can be obtained by other means such as saturable reactors or the like and in that case the capacitors could be omitted. By using a transformer in which the contactors or taps 34 may be adjusted, it is possible to set the motor to operate at any one of a plurality of different speeds. The contactors 34 are preferably connected to a single operator so as to move in unison with one another. Transformers of this type are now well known and need no further description.

Again referring to Figure 1 of the drawings, the operation of the motor shown therein is such that if the contactors 34 are moved in a direction away from the neutral point 36, the speed of the motor will be increased. By virtue of the above described arrangement, the winding 18 serves to electrically load the motor during light loads, and when this takes place, electrical energy flows from the winding 18 to the variable transformer 20 and is then fed back into the main power line. The winding 18, the transformer winding 20, and the conductors 22, 24 and 26 function as a feed back system when the rotor rotates above a predetermined speed and as a booster when rotating below a predetermined speed. However, at heavy mechanical loads the winding 18 may actually receive power from the power lines L1, L2 and L3 through the lines 22, 24 and 26, so that both the windings 14 and 18 will serve to produce mechanical torque. As explained hereinabove, the winding 18 is circumferentially displaced relative to the winding 14 to the extent that it primarily links the rotor flux and does not link any appreciable portion of the stator flux.

Figure 4:
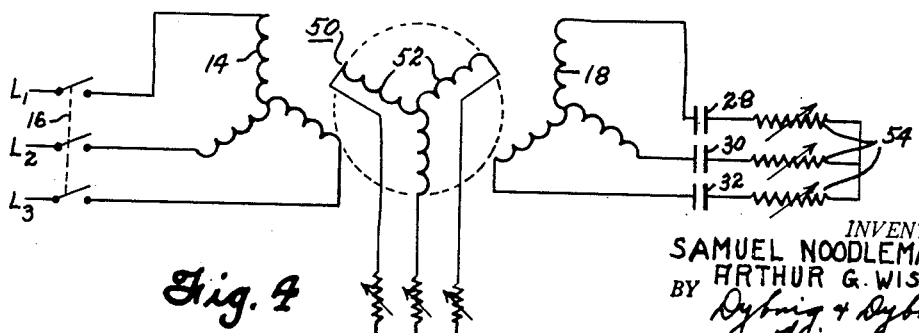
Figure 4 is a schematic circuit diagram similar to the one shown in Figure 1 but showing the invention applied to a motor having a wound rotor.

In Figure 4 of the drawings we have shown the invention applied to a polyphase alternating current motor of the type having a wound rotor. In this arrangement the wound rotor, generally designated by reference numeral 50, has replaced the squirrel cage rotor 10 and the individual armature windings 52 take the place of the rotor bars 12 shown in Figure 1. The variable transformer arrangement of Figure 1 has been replaced by the variable resistances 54 which serve to load the windings 18. In order to avoid needless repetition of description, the same reference numerals have been used to designate corresponding parts of Figures 1 and 4.

Whereas there are certain advantages to be gained by using a variable transformer connected as shown in Figure 1 for controlling the electrical loading of the motor, variable resistors, saturable reactors, or any other form of loading device could be used. Figure 4, for example, illustrates the use of a variable resistance 54 without any connection back to the main power lines.

Figure 2:
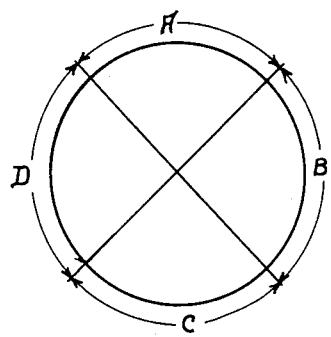
Figure 2 is a schematic diagram showing the positioning of the coils relative to the rotor in a squirrel cage type of motor.

In Figure 2 of the drawings there is schematically shown a recommended distribution of the various coils in a stator. The coils for producing the stator flux (such as the coils 14 of Figures 1 and 4) are preferably located in the quadrants designated as A and C, whereas the coils for linking the rotor flux are preferably located in the quadrants B and D. Other coil distributions in which the coils 14 are circumferentially spaced from the coils 18 would also work, but for practical considerations, the arrangement shown in Figure 2 is recommended as a very feasible distribution of coils.

Figure 3:
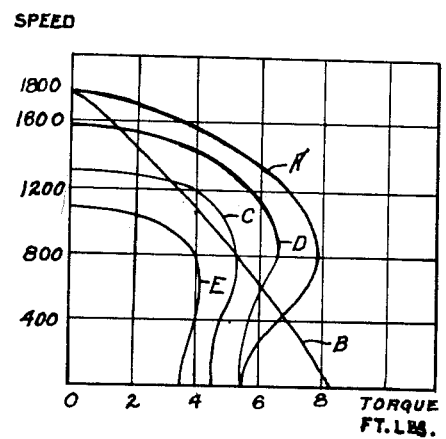
Figure 3 is a diagram illustrating the speed torque curves for three different types of motors.

Figure 3 is a diagram illustrating the speed-torque curves for three different types of motors. Thus, curve A represents the speed-torque curve of a conventional single speed squirrel cage type of alternating current motor. The curve B represents a corresponding curve of a conventional wound rotor type of alternating current motor used for variable speed purposes and set to operate at a speed of 1300 R. P. M. at a torque of 3 foot pounds, whereas curve C represents the speed-torque curve for a motor embodying our invention. Curve C represents a speed setting of 1300 R. P. M. It will be noted from a comparison of these three curves that the upper portion of curve C is relatively flat, indicating an unusually stable speed condition throughout the normal operating range. The upper portion of the curve C is even flatter than the corresponding portion of curve A of a conventional squirrel cage type of motor designed to operate at or near its synchronous speed. In comparison to this, curve B indicates a relatively unstable speed condition wherein the no load speed approaches very nearly the synchronous speed of the motor. By adjusting the variable load on the winding 18, a motor embodying our invention could be set to have other speed-torque characteristics such as represented by the curves D and E.

By virtue of the new and improved motor designs described herein, changes in the main line voltage do not materially affect the speed of the motor. Even at no load a 100% increase in the applied line voltage does not materially change the speed of the motor, even though such an increase in voltage results in almost four times as much available torque.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

We claim:

1. In an adjustable speed regulating electric motor having a stator member and a rotor member, one of which has two polyphase windings, each having the same number of phases, the two windings being non-inductively connected, means for energizing one of said windings so as to establish a magnetic field for inducing relative rotation between said members, and means for electrically loading the other of said windings, said last named means comprising means for adjusting the loading so as to vary the speed of the motor over a wide range.

2. An adjustable speed regulating electric motor having a stator member and a rotor member, one of which includes a first winding and a second winding, the second winding being substantially non-inductively mounted with respect to the first winding, means for energizing the first of said windings so as to establish a magnetic field for inducing relative rotation between said members, means for connecting the second of said windings to an electric load, said means including a plurality of capacitors, and means for adjusting said load so as to adjust the speed of said motor.

3. An adjustable speed regulating electric motor having a stator member and a rotor member, one of which includes a first polyphase winding and a second polyphase winding, each having the same number of phases, circumferentially displaced from one another, the second winding being positioned so as to pick up substantially no flux resulting directly from the flow of current through the first winding, means for energizing the first of said windings so as to establish a rotating magnetic field for inducing relative rotation between said members, means for connecting the second of said windings to an electric load, and means for varying said load so as to vary the speed of said motor.

4. In a speed regulating electric motor having a stator member and a rotor member, said stator member having first and second polyphase windings, each having the same number of phases, means for energizing the first of said windings so as to establish a magnetic field for inducing relative rotation between said rotor member and said stator member, a variable electric load, means for connecting the second of said windings to said electric load, said first and second windings being displaced from one another circumferentially so that the second winding picks up substantially no flux resulting directly from the flow of current through the first winding whereby said second polyphase winding primarily picks up flux generated by said rotor member.

5. In an electric motor having a stator and a rotor, said stator having a pair of polyphase windings, each having the same number of phases, circumferentially spaced from one another so that either one of the windings picks up substantially no flux resulting from the flow of current through the other winding, means for connecting a first one of said windings to a source of power so as to establish a magnetic field for inducing relative rotation between said stator and said rotor, a transformer, means for connecting a second one of said windings to one side of said transformer, and means for connecting the other side of said transformer to said first winding.

6. An adjustable speed regulating electric motor having a stator member and a rotor member, one of which includes a first polyphase winding and a second polyphase winding, each having the same number of phases, means for energizing the first of said polyphase windings so as to establish a rotating magnetic field for inducing relative rotation between said members, means for connecting the second of said polyphase windings to an electric load, and means for varying said load so as to vary the speed of said motor, said second polyphase winding being so positioned with respect to the first polyphase winding that the second polyphase winding picks up substantially no flux resulting directly from the current flowing in the first polyphase winding whereby said second polyphase winding primarily links only the flux produced as a result of relative rotation between said stator member and said rotor member.

7. In an electric motor having a stator and a rotor, a pair of polyphase windings, each having the same number of phases, provided on said stator, means for energizing a first of said windings so as to establish a magnetic field for inducing relative rotation between said rotor and said stator, the second of said windings being so positioned on the stator as to pick up substantially no flux resulting directly from the flow of current through the first winding, means for connecting an electrical load to the second of said windings so as to cause a current to be generated in said second winding, and means for supplying current generated in said second winding to said first winding.

8. In a variable speed polyphase electric motor having a stator member and a rotor member, one of which is provided with first and second polyphase windings, each having the same number of phases, circumferentially spaced from one another, the second winding being so positioned with respect to the first winding as to pick up substantially no flux resulting directly from the flow of current through the first winding, means for energizing one of said polyphase windings so as to establish a rotating magnetic field for inducing relative rotation between said members, means for connecting the other of said windings to the input of a variable transformer, and means for connecting the output of said variable transformer to said first named winding.

9. An adjustable speed regulating alternating current electric motor having a stator member and a rotor member, one of which includes a first polyphase winding for establishing magnetic poles and a second polyphase winding so positioned with respect to the first winding as to pick up substantially no flux resulting directly from the flow of current through the first winding, said second winding being arranged to link the flux produced as a result of relative rotation between said stator member and said rotor member so as to establish additional magnetic poles, means for supplying current to the first of said windings so as to establish a rotating magnetic field for inducing relative rotation between said members, means for connecting the second of said windings to an electric load, and means for varying said load so as to vary the amount of current generated in said second winding.

10. In an electric motor having a stator member and a rotor member, said stator member having a conventional three phase stator winding, means for energizing the conventional stator winding so as to establish a magnetic field for inducing relative rotation between said rotor member and said stator member, said stator member having a second three phase winding, said second winding being substantially non-inductively connected to the first winding so that as current flows through the first winding when the rotor member stands still substantially no current flows through the second winding, a variable electric load, and means for connecting the second winding to said variable electric load, the variable electric load including a variable transformer interposed between the second winding and the means for energizing the first winding, said variable electric load functioning as a feed back into the means for energizing the first winding when current is generated in the second winding as a result of the rotor member rotating at a speed higher than a predetermined normal operating speed, said variable electric load supplying energy to the rotor member when the rotor member rotates at a speed lower than the normal operating speed of the rotor member.

SAMUEL NOODLEMAN.
ARTHUR G. WISE.

References Cited in the file of this patent

UNITED STATES PATENTS

| Number | Name | Date |
|---|---|---|
| 730,108 | Girault | June 2, 1903 |
| 733,341 | Steinmetz | July 7, 1903 |
| 882,581 | Pauly | Mar. 24, 1908 |
| 1,356,933 | MacMillan | Oct. 26, 1920 |
| 1,478,012 | Varley | Dec. 18, 1923 |
| 1,719,889 | Kelsey | July 9, 1929 |
| 2,196,402 | Snyder | Apr. 9, 1940 |

FOREIGN PATENTS

| Number | Country | Date |
|---|---|---|
| 631,869 | Germany | June 30, 1936 |
| 42,699 | Netherlands | Mar. 15, 1938 |